United States Patent
Lin et al.

(10) Patent No.: US 10,499,336 B2
(45) Date of Patent: Dec. 3, 2019

(54) METHOD FOR DIRECT COMMUNICATION BETWEEN STATIONS IN WIRELESS LOCAL AREA NETWORK AND RELATED DEVICE

(71) Applicant: Huawei Technologies Co., Ltd., Shenzhen (CN)

(72) Inventors: Yingpei Lin, Shanghai (CN); Hongjia Su, Shanghai (CN); Jun Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/957,046

(22) Filed: Apr. 19, 2018

(65) Prior Publication Data

US 2018/0242251 A1 Aug. 23, 2018

Related U.S. Application Data

(63) Continuation of application No. PCT/CN2016/087459, filed on Jun. 28, 2016.

(30) Foreign Application Priority Data

Oct. 20, 2015 (CN) .......................... 2015 1 0685539
Nov. 3, 2015 (CN) .......................... 2015 1 0741092

(51) Int. Cl.
*H04W 52/02* (2009.01)
*H04L 29/06* (2006.01)
(Continued)

(52) U.S. Cl.
CPC ......... *H04W 52/0229* (2013.01); *H04L 69/22* (2013.01); *H04W 4/00* (2013.01);
(Continued)

(58) Field of Classification Search
CPC ... H04W 4/00; H04W 72/04; H04W 52/0229; H04W 8/14; H04W 84/12; H04L 69/22;
(Continued)

(56) References Cited

U.S. PATENT DOCUMENTS

2014/0140222 A1 5/2014 Jiang et al.
2014/0348148 A1 11/2014 You et al.
(Continued)

FOREIGN PATENT DOCUMENTS

AU 2013378208 A1 7/2015
CA 2933598 A1 6/2015
(Continued)

OTHER PUBLICATIONS

Zhang, J. et al., "HE-SIGA content," IEEE 802.11-15/1077r0, Sep. 13, 2015, 22 pages.
(Continued)

*Primary Examiner* — Brian D Nguyen
(74) *Attorney, Agent, or Firm* — Slater Matsil, LLP

(57) ABSTRACT

Embodiments provide a method for direct communication between stations in a wireless local area network and a related station. The method for direct communication between stations in a wireless local area network includes: sending, by a first station, a data frame to a second station, where the data frame includes a first high-efficiency signal field, and the first high-efficiency signal field includes first indication information used to indicate that the data frame is a single-user (SU) data frame and second indication information used to indicate that the data frame is a downlink (DL) data frame.

18 Claims, 6 Drawing Sheets

(51) Int. Cl.
*H04W 4/00* (2018.01)
*H04W 8/14* (2009.01)
*H04W 72/04* (2009.01)
*H04W 84/12* (2009.01)

(52) U.S. Cl.
CPC .............. *H04W 8/14* (2013.01); *H04W 72/04* (2013.01); *H04W 84/12* (2013.01); *Y02D 70/00* (2018.01); *Y02D 70/10* (2018.01); *Y02D 70/12* (2018.01); *Y02D 70/122* (2018.01); *Y02D 70/126* (2018.01); *Y02D 70/1224* (2018.01); *Y02D 70/1262* (2018.01); *Y02D 70/14* (2018.01); *Y02D 70/142* (2018.01); *Y02D 70/20* (2018.01); *Y02D 70/21* (2018.01)

(58) Field of Classification Search
CPC ........... Y02D 70/1224; Y02D 70/1262; Y02D 70/142; Y02D 70/21; Y02D 70/00; Y02D 70/14; Y02D 70/122; Y02D 70/126; Y02D 70/10; Y02D 70/20; Y02D 70/12
See application file for complete search history.

(56) References Cited

U.S. PATENT DOCUMENTS

| | | | |
|---|---|---|---|
| 2015/0382333 A1 | 12/2015 | Seok | |
| 2016/0014813 A1 | 1/2016 | Seok | |
| 2016/0113034 A1* | 4/2016 | Seok | H04W 74/04 370/329 |
| 2016/0119921 A1 | 4/2016 | Ma | |
| 2016/0380727 A1* | 12/2016 | Ryu | H04L 1/18 370/245 |
| 2017/0302417 A1* | 10/2017 | Chun | H04L 27/26 |
| 2017/0339692 A1* | 11/2017 | Chun | H04L 1/0003 |
| 2018/0159714 A1* | 6/2018 | Lee | H04L 27/26 |
| 2018/0212725 A1* | 7/2018 | Park | H04L 27/26 |
| 2018/0213516 A1* | 7/2018 | Kim | H04W 48/16 |
| 2018/0220443 A1* | 8/2018 | Kim | H04W 84/12 |

FOREIGN PATENT DOCUMENTS

| | | |
|---|---|---|
| CN | 104104476 A | 10/2014 |
| CN | 104184549 A | 12/2014 |
| JP | 2003018234 A | 1/2003 |
| KR | 20140105427 A | 9/2014 |
| KR | 20150099527 A | 8/2015 |
| WO | 2014126324 A1 | 8/2014 |
| WO | 2014179722 A1 | 11/2014 |

OTHER PUBLICATIONS

Asterjadhi, A. et al., "Identifiers in HE PPDUs for power saving," IEEE 802.11-15/1122r0, Sep. 12, 2015, 18 pages.

Stacey, Robert "Specification Framework for TGax", IEEE 802.11-15/0132r8, Sep. 22, 2015, 22 pages.

IEEE 802.11-2012, Part 11: Wireless LAN Medium Access Control (MAC) and Physical Layer (PHY) Specifications, IEEE Computer Society, Mar. 29, 2012, 2793 pages.

* cited by examiner

| L-STF | L-LTF | L-SIG | RL-SIG | HE-SIG-A | HE-STF | HE-LTF | HE-DATA for STA1 | PACKET EXTENSION |
|---|---|---|---|---|---|---|---|---|
| L-STF | L-LTF | L-SIG | RL-SIG | HE-SIG-A | | | | |
| L-STF | L-LTF | L-SIG | RL-SIG | HE-SIG-A | | | | |
| L-STF | L-LTF | L-SIG | RL-SIG | HE-SIG-A | | | | |

| L-STF | L-LTF | L-SIG | RL-SIG | HE-SIG-A | HE-SIG-B | HE-STF | HE-LTF | HE-DATA for STA1 | PACKET EXTENSION |
|---|---|---|---|---|---|---|---|---|---|
| L-STF | L-LTF | L-SIG | RL-SIG | HE-SIG-A | HE-SIG-B | | | HE-DATA for STA2 | |
| L-STF | L-LTF | L-SIG | RL-SIG | HE-SIG-A | HE-SIG-B | | | HE-DATA for STA3 | |
| L-STF | L-LTF | L-SIG | RL-SIG | HE-SIG-A | HE-SIG-B | | | | |

FIG. 3

| L-STF | L-LTF | L-SIG | RL-SIG | HE-SIG-A | HE-STF | HE-LTF | HE-DATA from STA1 | PACKET EXTENSION |
|---|---|---|---|---|---|---|---|---|
| L-STF | L-LTF | L-SIG | RL-SIG | HE-SIG-A | | | HE-DATA from STA2 | |
| L-STF | L-LTF | L-SIG | RL-SIG | HE-SIG-A | | | HE-DATA from STA3 | |
| L-STF | L-LTF | L-SIG | RL-SIG | HE-SIG-A | | | | |

FIG. 4

METHOD FOR DIRECT COMMUNICATION BETWEEN STATIONS IN WIRELESS LOCAL AREA NETWORK AND RELATED DEVICE

CROSS-REFERENCE TO RELATED APPLICATIONS

This application is a continuation of International Application No. PCT/CN2016/087459, filed on Jun. 28, 2016, which claims priority to Chinese Patent Application No. 201510741092.3, filed on Nov. 3, 2015, and Chinese Patent Application No. 201510685539.X, filed on Oct. 20, 2015. All of the aforementioned patent applications are hereby incorporated by reference in their entireties.

TECHNICAL FIELD

The present invention relates to the communications field, and more specifically, to a method for direct communication between stations in a wireless local area network and a related device.

BACKGROUND

A wireless local area network (WLAN for short) is a network system in which data is transmitted over the air using a radio frequency technology. With wide application of smart terminals, people have a growing demand for data network traffic, and using a WLAN to carry the traffic has become one of very important information data transmission manners.

A WLAN technology cannot develop without formulation and widespread application of WLAN standards. The Institute of Electrical and Electronics Engineers (IEEE for short) 802.11 family are main WLAN standards, and include several generations of prevailing standards: 802.11, 802.11b/g/a, 802.11n, and 802.11ac.

The WLAN technology is based on a computer network and a wireless communications technology. In a computer network structure, a logical link control (LLC) layer and an application layer above the logical link control layer may have same or different requirements on different physical (PHY) layers. Therefore, the WLAN standards are mainly directed at a physical layer and a Media Access Control (MAC) layer, and involve technical specifications and technical standards such as a range of used wireless frequencies, an air interface communications protocol, and the like.

A physical layer frame in the WLAN standards is also referred to as a physical layer convergence procedure (PLCP) protocol data unit (PPDU), and includes a PLCP header field and a PLCP service data unit (PSDU). The PLCP Header mainly includes a training field and a signal (SIG) field. The PSDU includes a MAC header field and a MAC service data unit.

Currently, the 802.11ax standard (also referred to as a high efficiency wireless local area network, High Efficiency WLAN (HEW) standard) under study and formulation further evolves the WLAN technology. In the 802.11ax standard, orthogonal frequency division multiple access (OFDMA) will be used as one of main technical points to improve transmission efficiency.

Currently, based on a design of signaling for an 802.11ax system, the signaling includes first high-efficiency signaling (HE-SIG-A) and second high-efficiency signaling (HE-SIG-B). The first high-efficiency signaling includes SU/MU indication information and UL/DL indication information. The SU/MU indication information is used to indicate whether a transmission type of subsequent data of the first high-efficiency signaling is single-user transmission or multi-user transmission. When the transmission type is only the SU transmission, HE-SIG-A includes UL/DL indication information, where the indication information is used to indicate whether a type of the current data packet transmission is uplink transmission or downlink transmission.

Currently, a MAC frame header based on an 802.11 system includes fields such as a frame control field, and a transmitter address (TA) and a receiver address (RA) of a data packet. The frame control field includes a To DS field and a From DS field, where the To DS field and the From DS field are used to describe whether a data packet comes from a distributed system and whether a data packet goes to the distributed system. The distributed system herein is a system that is used to connect multiple basic service sets (BSSs) and integrate multiple local area networks to create an extended service set (A system used to interconnect a set of basic service sets (BSSs) and integrated local area networks (LANs) to create an extended service set (ESS)).

In the 11ax system, when the SU/MU indication in HE-SIG-A is SU, HE-SIG-A includes a UL/DL field. The indication field is used to describe whether a transmission direction of the PPDU is uplink (UL) (e.g., from a STA to an AP) or downlink (DL) (e.g., from an AP to a STA). Direct communication between stations is an important communication manner of the 802.11 WLAN system. Data transmission between stations is implemented by means of direct transmission rather than by using an AP. The direct communication between stations is neither uplink nor downlink. When Device-to-Device (D2D) data transmission is performed, the UL/DL indication field in HE-SIG-A does not have information used to indicate uplink or downlink.

SUMMARY

Embodiments of the present invention provide an indication method for a signal in a Wireless Local Area Network (WLAN), so as to resolve a current problem of lack of an indication of a transmission type of a PPDU on a direct communication link between stations (Direct STA-to-STA Link) (DSSL) in a WLAN system.

According to a first aspect, a method for direct communication between stations in a wireless local area network is provided. The method includes sending, by a first station, a data frame to a second station. The data frame includes a first high-efficiency signal field, and the first high-efficiency signal field includes first indication information indicating that the data frame is a single-user (SU) data frame and second indication information indicating that the data frame is a downlink (DL) data frame.

Further, the data frame further includes a MAC header field, where a To DS field in the MAC header field is "o", and the first station configures a From DS field to be "o".

According to a second aspect, a method for direct communication between stations in a wireless local area network is provided. The method includes receiving, by a second station, a data frame sent by a first station, where the data frame includes a first high-efficiency signal field, and the first high-efficiency signal field includes first indication information used to indicate that the data frame is a single-user (SU) data frame and second indication information used to indicate that the data frame is a downlink (DL) data frame. The method also includes determining, by the second station according to the second indication information, whether transmission of subsequent data of a MAC header field is DL transmission or DSSL transmission.

Further, the data frame received by the second station further includes the MAC header field; and if a To DS field and a From DS field in the MAC header field are both "o", the second station determines that the transmission of the subsequent data of the MAC header field is the DSSL transmission.

According to a third aspect, a station, capable of performing D2D communication with another station is provided. The station includes a transceiver, configured to send a data frame to a second station. The data frame includes a first high-efficiency signal field, and the first high-efficiency signal field includes first indication information used to indicate that the data frame is a single-user (SU) data frame and second indication information used to indicate that the data frame is a downlink (DL) data frame.

Further, the data frame further includes a MAC header field, where a To DS field in the MAC header field is "o", and the first station configures a From DS field to be "o".

According to a fourth aspect, a station, capable of performing D2D data transmission with another station, is provided. The station includes a transceiver, configured to receive a data frame sent by a first station, where the data frame includes a first high-efficiency signal field, and the first high-efficiency signal field includes first indication information used to indicate that the data frame is a single-user (SU) data frame and second indication information used to indicate that the data frame is a downlink (DL) data frame. The station also includes a processor, configured to determine, according to the second indication information, whether data transmission is DL transmission or DSSL transmission.

Further, the data frame further includes a MAC header field. If a To DS field and a From DS field in the MAC header field are both "o", the processor determines that transmission of subsequent data of the MAC header field is the DSSL transmission.

According to the method for direct communication between stations in a wireless local area network and the station using the method in the embodiments of the present invention, SU/MU indication information in a high-efficiency signal field is configured to be SU, and UL/DL indication information in the high-efficiency signal field is configured to be DL, which may resolve a current problem of lack of an indication of a transmission type of data on a direct communication link between stations in a WLAN system.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 3 is a structural diagram of an MU downlink frame according to an embodiment of the present invention;

FIG. 4 is a structural diagram of an MU uplink frame according to an embodiment of the present invention;

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions of the present invention can be applied to various communications systems, for example, a Global System for Mobile Communications (GSM), a Code Division Multiple Access (CDMA) system, a Wideband Code Division Multiple Access (WCDMA), a general packet radio service (GPRS), a Long Term Evolution (LTE), and a wireless local area network (WLAN).

Figures 1, 2:
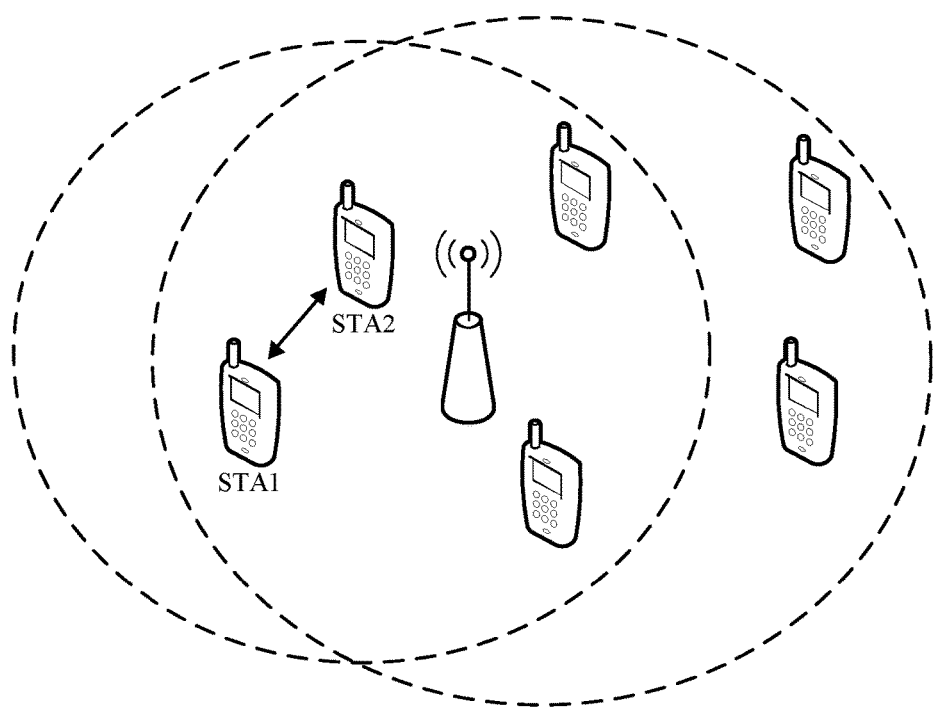
FIG. 1 is an example diagram of an application scenario according to embodiments of the present invention.
FIG. 2 is a structural diagram of an SU frame according to an embodiment of the present invention.

A base station in a wireless local area network is also referred to as an access point (AP), and UE in the wireless local area network is also referred to as a station (STA). To implement direct transmission between stations, a neighbor relationship between the stations needs to be established first. As shown in FIG. 1, if direct transmission between a STA1 and a STA2 in a cell 0 needs to be implemented, the STA1 and the STA2 need to determine respective neighboring stations. For example, for the STA1, neighbor relationships with a STA 3 and a STA4 need to be established; and for the STA2, neighbor relationships with a STA 9 and a STA10 need to be established. Optionally, the STA2 may further determine neighbor relationships with a STA 5 and a STA 11 in a cell 1. In this way, direct transmission between stations in a neighbor relationship can be implemented.

The embodiments of the present invention provide an indication method for signaling in a WLAN, so as to resolve a current problem of lack of an indication of a transmission type of a PPDU on a direct communication link between stations (DSSL or Direct STA-to-STA Link) in a WLAN system.

To achieve the foregoing objective, the embodiments of the present invention provide the following technical solutions.

Embodiment 1

Figure 7:
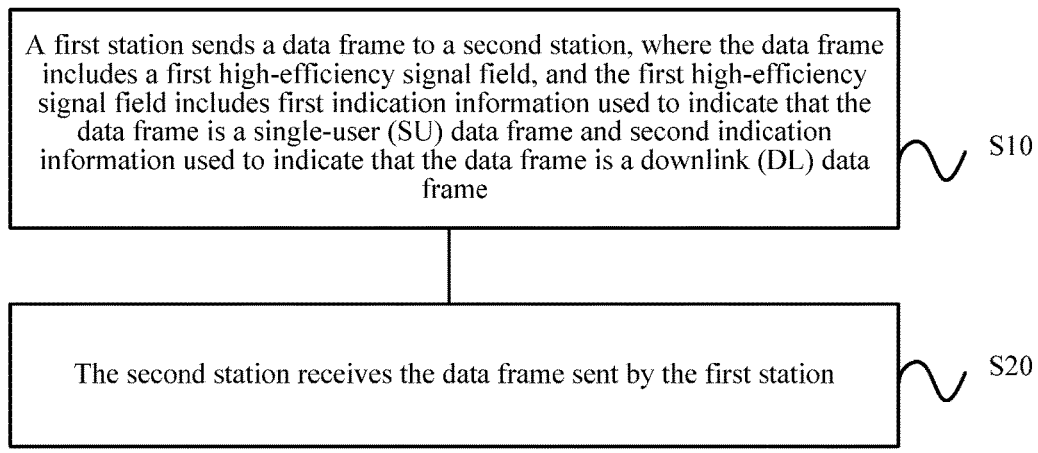
FIG. 7 is a flowchart of a method for direct communication between stations in a wireless local area network according to the present invention.

Referring to FIG. 7 and other accompanying drawings, a method for direct communication between stations in a wireless local area network is provided. The method includes generating, by a first station, a frame including first high-efficiency signaling. The method also includes configuring, by the first station, SU/MU indication information in the first high-efficiency signaling to be SU and configuring UL/DL indication information in the first high-efficiency signaling to be DL. The method also includes sending, by the first station, the frame including the first high-efficiency signaling (step S10 in FIG. 7).

Further, the first station generates a MAC header field, where the first station configures a To DS field in the MAC header field to be "o", and the first station configures a From DS field to be "o". The first station sends the MAC header field.

In another aspect, a method for direct communication between stations in a wireless local area network is provided. The method includes receiving, by a second station, a frame including first high-efficiency signaling (step S20 in FIG. 7), and reading, by the second station, that SU/MU indication information in the first high-efficiency signaling is SU, and determining that transmission of the currently received data is SU transmission. The method also includes reading, by the second station, that UL/DL indication information in the first high-efficiency signaling is DL, and determining that the current data transmission is DL transmission or DSSL transmission.

Further, the second station receives and reads a MAC header field. The second station reads that a To DS field and a From DS field in the MAC header field are both "o", and determines that transmission of subsequent data of the MAC header field is the DSSL transmission.

Figure 5:
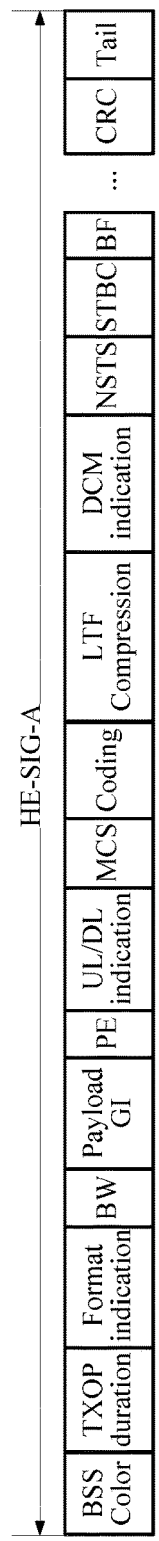
FIG. 5 shows fields included in high-efficiency signaling HE-SIG-A in an SU frame structure according to an embodiment of the present invention.
Figure 6:
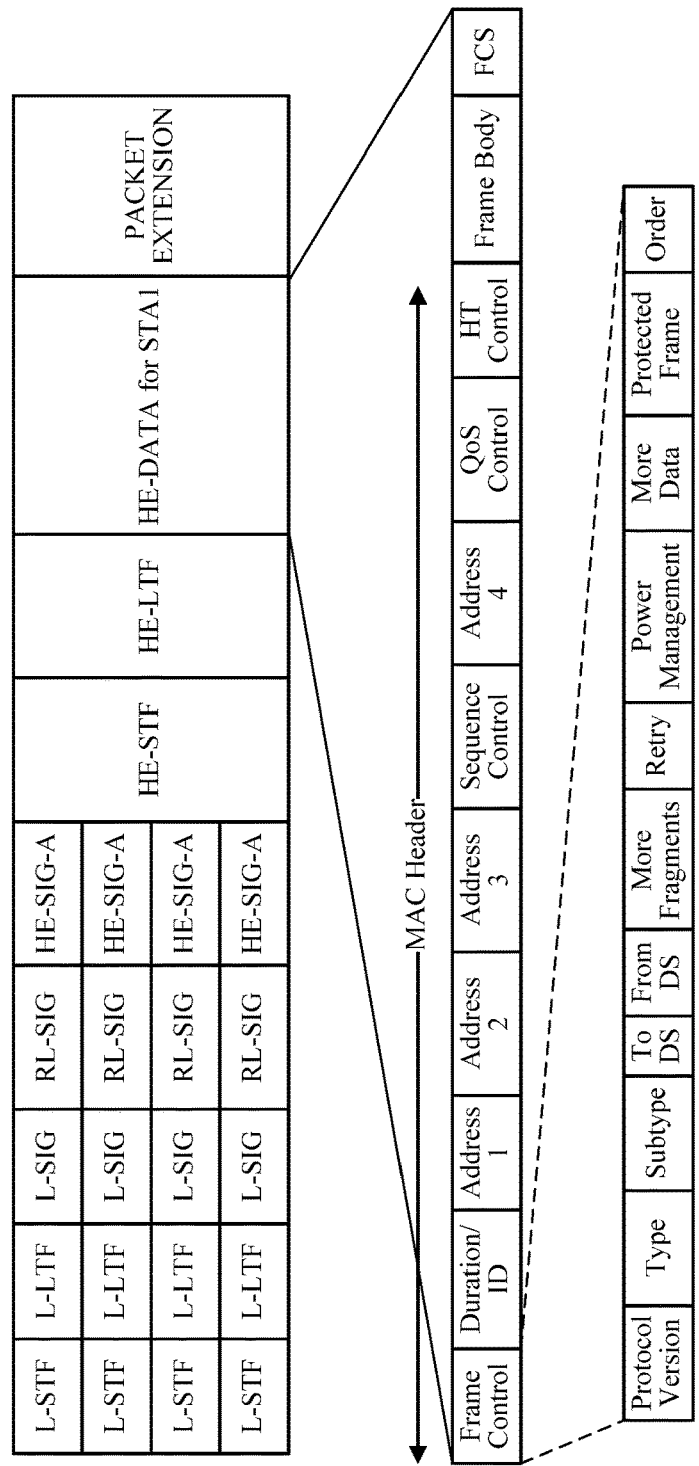
FIG. 6 is a structural diagram of a MAC frame according to the present invention.

In embodiments of the present invention, to further describe a structure of a data frame sent by a station in the present invention, FIG. 2 is a structural diagram of an SU frame according to an embodiment of the present invention, FIG. 3 and FIG. 4 are structural diagrams of an MU downlink frame and an MU uplink frame, FIG. 5 shows fields included in high-efficiency signaling HE-SIG-A in an SU frame structure according to an embodiment of the present invention, and FIG. 6 is a structural diagram of a MAC frame according to the present invention.

In an 11ax system, there are two types of frame structures. One is an SU (single-user) transmission frame format (shown in FIG. 2), and the other is a multi-user (MU) transmission frame structure, where the multi-user transmission frame structure includes a downlink transmission frame structure and an uplink transmission frame structure (respectively shown in FIG. 3 and FIG. 4). Whether a data frame is the SU or the MU frame structure is specifically determined according to indication formation of a Format indication field in HE-SIG-A. When the Format indication indicates SU, it is determined that a currently transmitted frame is an SU frame. When the Format indication indicates MU, whether there is HE-SIG-B may be determined according to a modulation method for a symbol carrying HE-SIG-A. For example, if a modulated phase of HE-SIG-A rotates, it indicates that the current frame includes an HE-SIG-B field, and indicates that the current frame is an MU downlink frame. If the modulated phase of HE-SIG-A does not rotate, it indicates that the current frame is an MU uplink frame. Alternatively, when the Format indication indicates MU, an MU uplink frame may be indicated when the modulated phase of HE-SIG-A rotates, and an MU downlink frame is indicated when the modulated phase of HE-SIG-A does not rotate. When the SU transmission frame structure is used, a structure of the HE-SIG-A field is shown in FIG. 3, and includes fields, such as BSS Color, TXOP duration, Format indication, BW, payload GI, PE, UL/DL Indication, MCS, coding, LTF Compression, DCM indication, NSTS, STBC, BF, CRC, and Tail. BSS Color indicates ID information of an AP related to a current frame. For example, BSS Color in a frame sent by an AP indicates an ID of the AP, and BSS Color in a frame sent by a STA indicates an ID of an AP associated with the STA. TXOP duration indicates remaining duration of a current TXOP, Format indication indicates SU transmission or MU transmission, BW indicates transmission bandwidth, payload GI indicates a length of a guard interval or a cyclic prefix (CP) that is used for a data transmission part, PE indicates a length of packet extension, and UL/DL Indication indicates whether the data frame is transmitted from the STA to the AP (UL) or transmitted from the AP to the STA (DL); MCS is used to indicate a modulation and coding scheme that is used for the data transmission part; coding is used to indicate an encoding mode, LTF Compression indicates whether an HE-LTF part is a compressed HE-LTF, DCM indication is used to indicate whether dual carrier modulation (DCM) is used, NSTS indicates a quantity of space-time streams, STBC is used to indicate whether STBC encoding is used for a data part, and BF indicates whether beamforming is used for the data transmission. CRC is a check bit and is used for check of transmission of HE-SIG-A. Because binary convolutional code encoding is performed on HE-SIG-A and the subsequent data part separately, six bits at the tail are set to 0 to clear an encoder and a decoder.

For direct communication between stations, because the communication is performed between single users, the SU transmission frame format is used. When a UL/DL indication in the HE-SIG-A field is UL, if a receiver finds that a data packet is sent by a STA in a BSS associated with the receiver (it is determined according to BSS ID information carried in the data packet), the receiver may enter a dormant state. Therefore, the UL/DL indication field in HE-SIG-A in the data packet of direct communication between stations indicates DL. Specific steps of data packet transmission between stations are as follows.

A sending station generates a frame of direct communication between stations, where an SU/MU indication in HE-SIG-A is SU, and a UL/DL indication is DL.

The sending station configures a To DS field in a MAC frame header field in the frame of direct communication to be "o", and the first station configures a From DS field to be "o", so as to indicate the communication frame is a frame of direct communication between stations, where a structure of the MAC frame header is shown in FIG. 6.

After a receiver of direct communication between stations receives a frame, the receiver first determines, according to BSS ID information in HE-SIG-A, that the frame is a communication frame sent by an AP or a STA in a BSS associated with the receiver, and further determines, according to the SU/MU indication, whether a structure of the frame is an SU frame structure. If the structure of the frame is the SU frame structure, the UL/DL field in HE-SIG-A is read, so as to determine whether data transmission is DL transmission.

When the communication frame has the SU transmission frame structure and the UL/DL indication in HE-SIG-A is DL, the receiver reads a To DS field and a From DS field in a MAC frame header in the communication frame. If the To DS field and the From DS field both indicate 0, it is determined that the communication frame is a frame of direct communication between stations. The receiver further reads a transmitter address field and a receiver address to determine whether the communication frame is sent to the receiver itself, so as to determine whether to perform subsequent receiving and processing.

Embodiment 2

A sending method for an indication of a data packet on a direct communication link between stations in a wireless local area network is provided.

A first station generates first high-efficiency signaling.

The first station configures SU/MU indication information in the first high-efficiency signaling to be SU, and configures UL/DL indication information in the first high-efficiency signaling to be DL.

The first high-efficiency signaling includes DSSL indication information, to indicate that data transmission of current sending is DSSL transmission.

The first station generates and sends the first high-efficiency signaling.

A second station receives and reads the first high-efficiency signaling.

The second station reads that the SU/MU indication information in the first high-efficiency signaling is SU, and determines that transmission of current receiving is SU transmission.

The second station reads that the UL/DL indication information in the first high-efficiency signaling is DL. The second station determines that the current data transmission is DL transmission or DSSL transmission.

The second station reads the DSSL indication information in the first high-efficiency signaling, and determines that the current data transmission is the DSSL transmission.

In an 11ax system, there are two types of frame structures. One is an SU (single-user) transmission frame structure (shown in FIG. 2) and the other is a multi-user (MU) transmission frame structure (shown in FIG. 3). Whether a data frame is the SU or MU frame structure is specifically determined according to SU/MU indication information in HE-SIG-A. The SU/MU indication may be distinguished according to a modulation method for a symbol carrying HE-SIG-A, or may be explicitly indicated in the HE-SIG-A field by using a specific field. When the SU transmission frame structure is used, there is a UL/DL indication field in the HE-SIG-A field to indicate whether a data frame is transmitted from a STA to an AP (UL) or transmitted from the AP to the STA (DL).

For direct communication between stations, because the communication is performed between single users, the SU transmission frame format is used. When a UL/DL indication in the HE-SIG-A field is UL, if a receiver finds that a data packet is sent by a STA in a BSS associated with the receiver (it is determined according to BSS ID information carried in the data packet), the receiver may enter a dormant state. Therefore, the UL/DL indication field in HE-SIG-A in the data packet of direct communication between stations indicates DL. In addition, to distinguish a transmission direction, 1-bit indication information is used in HE-SIG-A to indicate whether the communication frame is a frame of direct communication between stations.

Specific steps of data packet transmission between stations are as follows.

A sending station generates a frame of direct communication between stations, where an SU/MU indication in HE-SIG-A is SU, and a UL/DL indication is DL.

The sending station configures an indication of direct communication between stations in HE-SIG-A to be Yes (for example, 1 represents Yes and 0 represents No).

After a receiver of direct communication between stations receives a frame, the receiver first determines, according to BSS ID information in HE-SIG-A, that the frame is a communication frame sent by an AP or a STA in a BSS associated with the receiver. If the communication frame is sent by the AP or the STA in the BSS, whether a structure of the frame is an SU frame structure is further determined according to the SU/MU indication in HE-SIG-A. If the structure of the frame is the SU frame structure, the UL/DL field in HE-SIG-A is read, so as to determine whether data transmission is DL transmission.

When the communication frame has the SU transmission frame structure and the UL/DL indication in HE-SIG-A is DL, the receiver reads indication information of direct communication between stations in HE-SIG-A in the communication frame. If the indication information is Yes, it is determined that the communication frame is a frame of direct communication between stations. The receiver further reads a transmitter address field and a receiver address in a MAC header to determine whether the communication frame is sent to the receiver itself, so as to determine whether to perform subsequent receiving and processing.

Embodiment 3

A sending method for an indication of a data packet on a direct communication link between stations in a wireless local area network is provided.

A first station generates first high-efficiency signaling. The first station configures SU/MU indication information in the first high-efficiency signaling to be SU, and configures UL/DL indication information in the first high-efficiency signaling to be DL. The first station sends the first high-efficiency signaling.

Further, the first station generates a MAC header field. The first station configures a transmitter address field in the MAC header field to be a MAC address of the first station, and the first station configures a receiver address field in the MAC header field to be a MAC address of a second station. The first station sends the MAC header field.

In another aspect, a receiving method for an indication of a data packet on a direct communication link between stations in a wireless local area network is provided.

A second station receives and reads first high-efficiency signaling. The second station reads that SU/MU indication information in the first high-efficiency signaling is SU, and determines that transmission of subsequent data of the first high-efficiency signaling is SU transmission. The second station reads that UL/DL indication information in the first high-efficiency signaling is DL, and determines that the transmission of the subsequent data of the first high-efficiency signaling is DL transmission or DSSL transmission.

Further, the second station receives and reads a MAC header field. The second station reads that a transmitter address field in the MAC header field is a MAC address of a first station, and that the first station configures a receiver address in the MAC header field to a MAC address of the second station, and determines that transmission of subsequent data of the MAC header field is the DSSL transmission.

In an 11ax system, there are two types of frame structures. One is an SU (single-user) transmission frame structure (shown in FIG. 2) and the other is a multi-user (MU) transmission frame structure (shown in FIG. 3). Whether a data frame is the SU or MU frame structure is specifically determined according to SU/MU indication information in HE-SIG-A. The SU/MU indication may be distinguished according to a modulation method for a symbol carrying HE-SIG-A, or may be explicitly indicated in the HE-SIG-A field by using a specific field. When the SU transmission frame structure is used, there is a UL/DL indication field in the HE-SIG-A field to indicate whether a data frame is transmitted from a STA to an AP (UL) or transmitted from the AP to the STA (DL).

For direct communication between stations, because the communication is performed between single users, the SU transmission frame format is used. When a UL/DL indication in the HE-SIG-A field is UL, if a receiver finds that a data packet is sent by a STA in a BSS associated with the receiver (it is determined according to BSS ID information carried in the data packet), the receiver may enter a dormant state. Therefore, the UL/DL indication field in HE-SIG-A in the data packet of direct communication between stations indicates DL. Specific steps of data packet transmission between stations are as follows:

A sending station generates a frame of direct communication between stations, where an SU/MU indication in HE-SIG-A is SU, and a UL/DL indication is DL.

The sending station configures a transmitter address field in a MAC frame header field in the frame of direct communication to be a MAC address of the sending station, and configures a receiver address field to be a MAC address of a receiver of direct communication between stations.

After the receiver of direct communication between stations receives a frame, the receiver first determines, according to BSS ID information in HE-SIG-A, that the frame is a communication frame sent by an AP or a STA in a BSS associated with the receiver. If the communication frame is sent by the AP or the STA in the BSS, whether a structure of the frame is an SU frame structure is further determined according to the SU/MU indication in HE-SIG-A. If the structure of the frame is the SU frame structure, the UL/DL field in HE-SIG-A is read, so as to determine whether data transmission is DL transmission.

When the communication frame has the SU transmission frame structure and the UL/DL indication in HE-SIG-A is DL, the receiver reads the transmitter address field and the receiver address field in the MAC frame header in the communication frame. If the transmitter address field is the same as a MAC address of a peer end of the receiver in direct communication between stations, and the receiver address is the same as a MAC address of the receiver, the receiver determines that the communication frame is sent to the receiver itself, so as to determine to perform subsequent receiving and processing.

Embodiment 4

The present invention further provides a related apparatus for executing the method in the foregoing embodiment.

Figure 8:
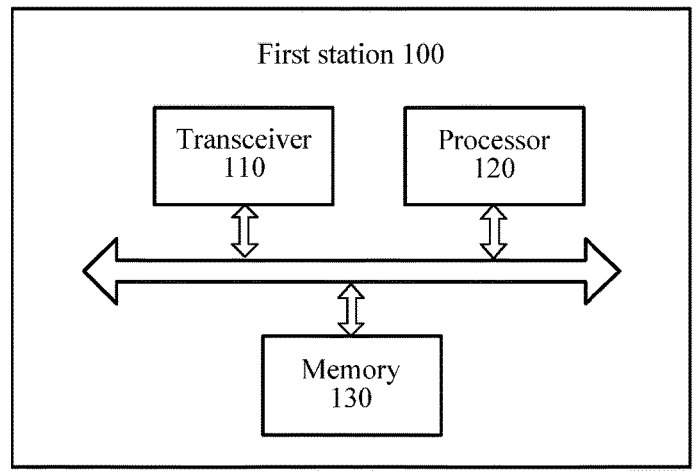
FIG. 8 is a composition diagram of a first station according to an embodiment of the present invention.

Referring to FIG. 8, a first station 100, capable of performing D2D communication with another station is provided. The first station 100 includes a transceiver 110, configured to send a data frame to a second station, where the data frame includes a first high-efficiency signal field, and the first high-efficiency signal field includes first indication information used to indicate that the data frame is a single-user (SU) data frame and second indication information used to indicate that the data frame is a downlink (DL) data frame. The first station 100 also includes a memory 130, configured to store related information for executing the method in the foregoing embodiment. The first station 100 also includes a processor 120, configured to execute the method in the foregoing embodiment.

Further, the data frame further includes a MAC header field, where a To DS field in the MAC header field is "o", and the first station configures a From DS field to be "o".

Figure 9:
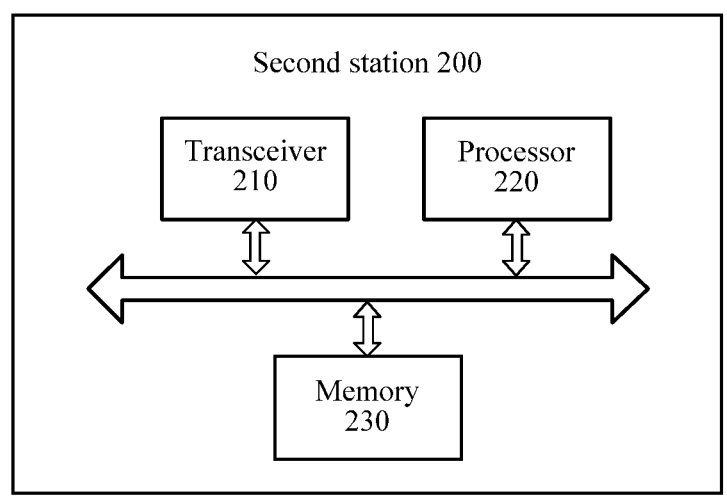
FIG. 9 is a composition diagram of a second station according to an embodiment of the present invention.

Referring to FIG. 9, a second station 200, capable of performing D2D communication with another station is provided. The second station 200 includes a transceiver 210, configured to receive a data frame sent by a first station, where the data frame includes a first high-efficiency signal field, and the first high-efficiency signal field includes first indication information used to indicate that the data frame is a single-user (SU) data frame and second indication information used to indicate that the data frame is a downlink (DL) data frame. The second station 200 also includes a processor 220, configured to determine, according to the second indication information, whether data transmission is DL transmission or DSSL transmission. The second station 200 also includes a memory 230, configured to store related information for executing the method in the foregoing embodiment.

It should be understood that in this embodiment of the present invention, the processor may be a central processing unit (CPU), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor or the processor may be any conventional processor or the like.

The memory may include a read-only memory and a random access memory, and provides an instruction and data to the processor. A part of the memory may further include a non-volatile random access memory. For example, the memory may further store device type information.

The bus system may include a power bus, a control bus, a status signal bus, and the like in addition to a data bus. However, for the purpose of clear description, various buses in the figure are all marked as the bus system 730.

Embodiment 5

In the foregoing embodiment, if a D2D station (for example, user equipment) receives information having an uplink indication (UPLINK), the D2D station determines that another station performs uplink transmission with an access point, and remains in a dormant state and does not perform D2D transmission. However, a UL/DL indication (UP/DL indication) in HE-SIG-A is identified as DL, so that the D2D device can remain in a non-dormant state and performs normal D2D transmission.

In addition, the UL/DL indication (UP/DL indication) in HE-SIG-A may be replaced by an identifier UPLINK_FLAG.

In Embodiment 5 of the present invention, a STA transmitting an HE SU PPDU that is addressed to an AP shall set the TXVECTOR parameter UPLINK_FLAG to 1.

If UPLINK_FLAG in an HE SU PPDU that is sent by a station to an access point is set to 1, it indicates that the HE SU PPDU is an uplink frame.

A AP transmitting an HE SU PPDU that is addressed to a non-AP STA shall set the TXVECTOR parameter UPLINK_FLAG to 0.

If a station sends an HE SU PPDU to a non-AP (non-AP) station, UPLINK_FLAG in the HE SU PPDU is set to 0, and it indicates that the HE SU PPDU is a non-uplink frame.

In Embodiment 5 of the present invention, if UPLINK_FLAG=1, it indicates that a data frame is an uplink frame; if UPLINK_FLAG=0, it indicates that the data frame is a non-uplink frame, where the non-uplink frame may be a downlink frame or a D2D transmission frame.

Embodiment 5 of the present invention discloses a method for direct communication between stations in a wireless local area network, including: sending, by a first station, a data frame to a second station, where the data frame includes a first high-efficiency signal field, and the first high-efficiency signal field includes first indication information used to indicate that the data frame is a single-user (SU) data frame and second indication information used to indicate whether the data frame is an uplink frame.

Specifically, when the second indication information is 1, it indicates that the data frame is an uplink frame; when the second indication information is 0, it indicates that the data frame is a non-uplink frame.

Referring to FIG. 8 and FIG. 9, Embodiment 5 of the present invention further discloses a station 100, capable of performing D2D communication with another station, including: a transceiver 110, configured to send a data frame to a second station 200, where the data frame includes a first high-efficiency signal field, and the first high-efficiency signal field includes first indication information used to indicate that the data frame is a single-user (SU) data frame and second indication information used to indicate whether the data frame is an uplink frame.

Specifically, when the second indication information is 1, it indicates that the data frame is an uplink frame; when the second indication information is 0, it indicates that the data frame is a non-uplink frame.

Embodiment 6

Embodiment 5 of the present invention further discloses a method for direct communication between stations in a wireless local area network, including: receiving, by a second station, a data frame sent by a first station, where the data frame includes a first high-efficiency signal field, and the first high-efficiency signal field includes first indication information used to indicate that the data frame is a single-user (SU) data frame and second indication information used to indicate whether the data frame is an uplink frame; and determining, by the second station according to the second indication information, whether transmission of subsequent data of a MAC header field is DL transmission or DSSL transmission.

When the second indication information is 1, it indicates that the data frame is an uplink frame. When the second indication information is 0, it indicates that the data frame is a non-uplink frame.

Embodiment 6 of the present invention further discloses a station 200, capable of performing D2D data transmission with another station, including: a transceiver 210, configured to receive a data frame sent by a first station 100, where the data frame includes a first high-efficiency signal field, and the first high-efficiency signal field includes first indication information used to indicate that the data frame is a single-user (SU) data frame and second indication information used to indicate whether the data frame is an uplink frame; and a processor 220, configured to determine, according to the second indication information, whether data transmission is non-uplink transmission, where the non-uplink transmission includes DL transmission or DSSL transmission.

When the second indication information is 1, it indicates that the data frame is an uplink frame. When the second indication information is 0, it indicates that the data frame is a non-uplink frame.

In an implementation process, the steps of the foregoing methods may be completed by using an integrated logical circuit of hardware in the processor 910 or an instruction in a form of software. Steps of the methods disclosed with reference to the embodiments of the present invention may be directly performed and completed by means of a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 920, and the processor 910 reads information in the memory 920 and completes the steps of the foregoing methods in combination with hardware of the processor 910.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   receiving, by a second station, a data frame sent by a first station, wherein the data frame comprises a first high-efficiency signal field and a media access control (MAC) header field;
   determining, by the second station according to uplink/downlink (UL/DL) indication information in the first high-efficiency signal field, that the data frame is a first type of transmission, wherein the first type of transmission is a downlink (DL) transmission or a direct station-to-station (STA-to-STA) link (DSSL) transmission; and
   after determining that the data frame is the first type of transmission, determining, by the second station, that the data frame is the DSSL transmission according to a To DS field and a From DS field in the MAC header field.

2. The method according to claim 1, wherein the UL/DL indication information indicates whether the data frame is an uplink (UL) transmission or the first type of transmission.

3. The method according to claim 1, wherein the To DS field and the From DS field indicate whether the data frame is the DL transmission or the DSSL transmission.

4. The method according to claim 1, wherein determining, by the second station, that the data frame is the DSSL transmission according to the To DS field and the From DS field in the MAC header field comprises:
   determining, by the second station, that the data frame is the DSSL transmission when the To DS field has a value of zero and the From DS field has a value of zero.

5. A non-transitory computer-readable storage medium comprising instructions which, when executed by a computer, cause the computer to carry out the method of claim 1.

6. A method, comprising:
   generating, by a first station, a data frame; and
   sending, by the first station, the data frame to a second station;
   wherein the data frame comprises a first high-efficiency signal field and a media access control (MAC) header field, wherein the first high-efficiency signal field comprises uplink/downlink (UL/DL) indication information, and the MAC header field comprises a To DS field and a From DS field; and
   wherein the UL/DL indication information, the To DS field, and the From DS field are used together to determine that the data frame is a direct station-to-station (STA-to-STA) link (DSSL) transmission.

7. The method according to claim 6, wherein the UL/DL indication information indicates whether the data frame is an uplink (UL) transmission or a first type of transmission, and the first type of transmission is a downlink (DL) transmission or the DSSL transmission.

8. The method according to claim 6, wherein the To DS field and the From DS field indicate whether the data frame is a downlink (DL) transmission or the DSSL transmission.

9. The method according to claim 6, wherein the To DS field has a value of zero and the From DS field has a value of zero.

10. A non-transitory computer-readable storage medium comprising instructions which, when executed by a computer, cause the computer to carry out the method of claim 6.

11. A station, comprising:
   a receiver, configured to receive a data frame sent by a first station, wherein the data frame comprises a first high-efficiency signal field and a media access control (MAC) header field; and
   a processor, configured to:
      determine that the data frame is a first type of transmission according to uplink/downlink (UL/DL) indication information in the first high-efficiency signal field, wherein the first type of transmission is a downlink (DL) transmission or a direct station-to-station (STA-to-STA) link (DSSL) transmission; and
      after determining that the data frame is the first type of transmission, determine that the data frame is the DSSL transmission according to a To DS field and a From DS field comprised in the MAC header field.

12. The station according to claim 11, wherein the UL/DL indication information indicates whether the data frame is an uplink (UL) transmission or the first type of transmission.

13. The station according to claim 11, wherein the To DS field and the From DS field indicate whether the data frame is the DL transmission or the DSSL transmission.

14. The station according to claim 11, wherein the processor being configured to determine that the data frame is the DSSL transmission according to the To DS field and the From DS field in the MAC header field comprises the processor being configured to:
   determine that the data frame is the DSSL transmission when the To DS field has a value of zero and the From DS field has a value of zero.

15. A station, comprising:
   a processor, configured to generate a data frame, wherein the data frame comprises a first high-efficiency signal field and a media access control (MAC) header field, the first high-efficiency signal field comprises uplink/downlink (UL/DL) indication information, and the MAC header field comprises a To DS field and a From DS field, and the UL/DL indication information, the To DS field, and the From DS field are used together to determine that the data frame is a direct station-to-station (STA-to-STA) link (DSSL) transmission; and
   a transmitter, configured to send the data frame to a second station.

16. The station according to claim 15, wherein the UL/DL indication information indicates whether the data frame is an uplink (UL) transmission or a first type of transmission, wherein the first type of transmission is a downlink (DL) transmission or the DSSL transmission.

17. The station according to claim 15, wherein the To DS field and the From DS field indicate whether the data frame is a downlink (DL) transmission or the DSSL transmission.

18. The station according to claim 15, wherein the To DS field has a value of zero and the From DS field has a value of zero.

* * * * *